3,231,576
**PROCESS FOR THE PREPARATION OF 2-PIPERI-
DONES AND 2-PYRROLIDONES BY HYDRO-
FORMYLATION AND AMINOLYSIS**
Jürgen F. Falbe, Bonn, and Friedrich W. A. G. K. Korte, Hangelar, Germany, assignors to Shell Oil Company, New York, N.Y., a corporation of Delaware
No Drawing. Filed Mar. 25, 1963, Ser. No. 267,798
Claims priority, application Germany, May 28, 1962, S 79,658
8 Claims. (Cl. 260—294.7)

This invention relates to a process for the preparation of lactams, particularly pyrrolidones and piperidones.

In accordance with this invention, lactams containing from five to six atoms in the lactam ring are prepared by hydroformylating unsaturated carboxylates (acids and esters) containing carbon-to-carbon unsaturation separated by no more than one other carbon atom from the carboxyl group with carbon monoxide and hydrogen in the presence of a hydroformylation catalyst and reacting the hydroformylation product under the hydroformylation conditions except at a higher temperature above 260° C. with ammonia and/or primary amine.

This invention comprehends the use of readily available starting materials to obtain high yields of lactams in essentially a one-operation process. The starting materials are unsaturated carboxylic acids and their esters, such as acrylic acid, methacrylic acid, and crotonic acid or higher molecular weight acids such as cyclohept-1-enyl isobutyric acid, dimethylvinyl acetic acid, and the like. Unsaturated dicarboxylic acids may also be used such as maleic acid and fumaric acid and their esters. Acids and esters with several double bonds such as sorbic acid esters are also suitable. The esters are the preferred starting materials, especially the lower alkyl esters such as the methyl, ethyl and propyl esters of alpha,beta- and beta, gamma-ethylenically unsaturated lower aliphatic carboxylic acids.

It has been found that the type of starting material greatly influences whether pyrrolidones or piperidones are prepared in this lactam preparation process. Thus pyrrolidones are obtained from the preferred alpha,beta-unsaturated acid esters, acrylic and methacrylic acid esters. Mixtures of pyrrolidones and piperidones are generally obtained from beta,gamma-unsaturated acids and their esters. Thus, mixtures are obtained when unbranched unsaturated carboxylic acids containing a chain of more than three carbon atoms, or their esters, such as crotonic acid ester are used. Likewise mixtures of pyrrolidones and piperidones are generally obtained when branched unsaturated carboxylic acids containing more than four carbon atoms and an unsaturated chain of at least three carbon atoms or their esters, such as alpha-methyl crotonic acid ester are used.

Piperidones are mainly formed from a branched unsaturated carboxylic acid with more than four carbon atoms or its ester which is branched in the beta-position. Thus beta-methyl piperidones are obtained from beta-methylcrotonic acid esters. However, if the starting material is a branched unsaturated carboxylic acid with more than four carbon atoms or its ester which is branched in the gamma position such as gamma,gamma-dimethyl-crotonic acid, essentially only pyrrolidones are formed.

In order to prevent polymerization of the unsaturated acids and esters, a polymerization inhibitor may be added to the unsaturated compound. A compound such as, for example, hydroquinone or the like has been found suitable for this purpose.

The hydroformylation of the unsaturated carboxylates is carried out with a mixture of carbon monoxide and hydrogen, commonly referred to as synthesis gas, in a molar ratio of approximately 1:1 although a lower ratio such as 1:2 and a higher ratio such as 1.1:1 may be advantageous under certain conditions. The carbon monoxide and hydrogen are preferably used in at least stoichiometric quantities.

Suitable hydroformylation catalysts for this process are conventional catalysts such as metals or compounds of metals of Group VIII of the Periodic Table. For example, catalysts of the cobalt or iron type, especially those in the form of carbonyl or hydrocarbonyl compounds such as cobalt hydrocarbonyl $HCo(CO)_4$ or dicobalt octacarbonyl $Co_2(CO)_8$ are satisfactory. The catalysts may be used not only in the form of salts such as chlorides, acetates, naphthenates and phenolates; but also in the form of oxides such as cobalt oxide; or in the form of a metal such as Raney cobalt. It has also been found advantageous to use complexes of cobalt carbonyl and tertiary phosphines, e.g., trialkyl phosphines such as, for example, tributyl phosphine. Cobalt compounds are preferably used in this process.

It is preferable to employ the organic complex catalyst in quantities ranging from about 1% to about 5% by weight based upon the reaction mixture. In special cases, however, higher or lower concentrations may also be employed. The catalyst is in general used in the form of a solution or suspension in a liquid medium such as the unsaturated acids or the esters or in such hydrocarbons as benzene, toluene and cyclohexane.

The hydroformylation may be carried out in an autoclave which is under pressure, the pressure being from at least 30 atm. to about 600 atm., depending in part on the catalyst used, and preferably in the range from about 150 to 300 atm. when using cobalt carbonyl or hydrocarbonyl as catalyst. The pressure depends to some extent on the hydroformylation catalyst used. For example when the cobalt carbonyl trialkyl phosphine complex catalyst is used the hydroformylation is suitably carried out at low pressures such as from about 30 atm. to about 50 atm.

The hydroformylation temperature should be at least 180° C. and preferably about 200° C. The lactam yield decreases markedly when the hydroformylation temperature is under 180° C. Suitable hydroformylation temperatures are from about 220° C. to about 280° C. and ideally from about 240° C. to about 260° C. A reaction time of from about one hour to about four hours has been found to be generally sufficient.

The hydroformylation reaction may be carried out with or without an inert solvent. Hydrocarbon solvents such as benzene, xylene, cyclohexane and the like may be used.

After the unsaturated carboxylates are hydroformylated, the hydroformylation product is aminolysed, that is, reacted with ammonia or a primary amine, which may be called primary amine compounds, $RNH_2$ in which R is hydrogen or an organic radical, preferably hydrocarbon or hydrocarbon substituted with amino groups, hydroxyl, ether groups, halogen, ester or other groups non-reactive to lactones and lactams. The hydroformylation product does not have to be separated from the reaction mixture before aminolysis; mere venting of the synthesis gas is sufficient. However, if it is desired the solvent, which may have been used, may be distilled off or any solid components present may be filtered. In general, however, the crude hydroformylation product may be reacted, after the synthesis gas is vented, with ammonia or a primary amine to produce the desired lactam.

Various primary amines can be used, both substituted and unsubstituted, generally of from 1 to 30 carbons, preferably 1 to 15. The unsubstituted hydrocarbon amines, both saturated and unsaturated, aliphatic and aromatic are especially useful; these are illustrated by:

(1) alkylamines such as methylamine, ethylamine, isopropylamine, n-butylamine, laurylamine, and stearylamine; (2) cycloalkylamines such as cyclohexylamine and cyclopentylamine; (3) aromatic amines such as aniline, toluidine, alpha- and beta-naphthylamine, p-phenylene diamine, and benzylamine; (4) alkenylamines such as allylamine, crotylamine, and oleylamine, and (5) alkylene diamines and polyalkylene polyamines such as ethylene diamine, propylene diamine, diethylene triamine and triethylene tetramine. Illustrative substituted amines are: (1) hydroxyalkylamines such as ethanolamine and propanolamine; (2) haloalkylamines such as beta- and gamma-chloropropylamines, bromopropylamine, and 9- and 10-bromo and 9,10-dibromo stearylamines; (3) alkoxyalkylamines such as gamma-methoxypropylamine and gamma-ethoxypropylamine; (4) alkanoyloxy alkylamines such as gamma-acetyloxy propylamine; and (5) alkylaminoalkylamines such as stearylaminopropylamine, ethylaminoethylamine, and butylaminopropylamine.

Suitable primary amines that have been found to be satisfactory are methylamine, ethylamine, lauryl amine, ethanol amine, cyclohexyl amine, dodecyl amine, and aniline. An excess of ammonia or primary amine is preferably employed, usually in the range of from about 20% to about 500% molar excess, based on the unsaturated carboxylates.

The aminolysis should be carried out at a temperature above 260° C. and preferably between 300° C. and 320° C., preferably above the hydroformylation temperature. Experiments have shown that when aminolysis is conducted at temperatures under 260° C. formation of the desired lactams is greatly diminished, if lactams are formed at all.

If cobalt hydrocarbonyl or some other like catalyst has been used and the resultant hydroformylation product is acid, it is advantageous to first neutralize the crude hydroformylation product with other bases such as caustic soda or lime and the like. The addition of these other bases insures that the ammonia or primary amine will be used in the aminolysis process and will not have to be used to neutralize the acid components.

Solvents may be added if desired before or during the aminolysis. Solvents such as benzene, toluene, xylene, acetone, methanol, ethanol and the like are suitable.

The aminolysis products may be worked up by any of several known methods such as, for example, by fractionation, extraction and precipitation and the like. If the aminolysis product is to be distilled it has been found that the presence of $P_2O_5$ in the distillation mixture increases the lactam yield.

One of the advantages of the above process is that the aminolysed reaction product does not have to be cleaned of soluble catalyst residues before distillation as the hydroformylation catalyst in this process is broken down substantially quantitatively in the course of the aminolysis so that after the aminolysis is complete, the catalyst is present in the autoclave as a sludge. This sludge therefore remains behind as a distillation residue. However in the presence of synthesis gas it returns to its active catalytic state and can then be reused.

The lactams prepared in accordance with this invention in very high yields may be used as valuable intermediate products, particularly for plastics, dyes and pharmaceutical preparations. The lactams are also valuable intermediate products for solvents such as acetylene and solubilizing agents. The pyrrolidone obtained from acrylic acid ester and ammonia can thus be reacted in a known manner with acetone under elevated pressure and in the presence of strongly alkaline substances such as potassium to form N-vinyl pyrrolidone.

The invention will be more fully understood by consideration of the following examples which are given to illustrate preferred embodiments of the invention and should not be construed to limit the invention since the variation of certain factors will be well understood by those skilled in the art.

Example I

A quantity of 250 grams of ethyl acrylate, stabilized by the addition of a small quantity of hydroquinone, 650 ml. of benzene and 11.67 grams of $Co_2(CO)_8$ were introduced into a 2-liter magnetically operated agitating autoclave. A mixture of carbon monoxide and hydrogen in a 1:1 ratio was introduced until the pressure in the autoclave was 200 atm. and the autoclave heated to 250° C. After the required temperature had been reached the carbon monoxide/hydrogen mixture was again introduced until the final pressure was 300 atm. and stirring continued for two hours. The excess synthesis gas was then vented, 124 grams of monomethyl amine were introduced, and stirring continued for four hours at 300° C. The autoclave was subsequently cooled, the catalyst decomposition products removed by filtration, the solvent distilled off in vacuo and the remaining crude product subjected to fractional distillation.

The following fractions were obtained:

(1) B.P.$_{(16\ mm.)}$: 40–84° C. (10.6 g.) $n_{20}$=1.4243 (largely solvent)
(2) B.P.$_{(16\ mm.)}$: 84–96° C. (162.4 g.) $n_{20}$=1.4663 (N-methyl-2-pyrrolidone)
(3) B.P.$_{(16\ mm.)}$: 96–121° C. (9.0 g.) $n_{20}$=1.4567
(4) B.P.$_{(11\ mm.)}$: 121–247° C. (53.0 g.)

After further distillation at normal pressure, fractions 3 and 4 yielded a further 21 grams of N-methyl-2-pyrrolidone Total N-methyl-2-pyrrolidone yield: 183.5 grams= 74.5% of theory

*Analysis.*—Calculated: C, 60.6; H, 9.2; N, 14.1. Found: C, 60.2; H, 9.4; N, 14.0.

Example II

Procedure as in Example I.

Starting materials:
  150 g. of ethyl acrylate
  17.5 g. of $Co_2(CO)_8$ in 150 ml. of benzene
  135 g. of ethylamine Reaction conditions:

(a) Hydroformylation:
  Initial pressure _____ atm__ 200
  Final pressure _____ atm__ 301
  Reaction temperature _____ °C__ 250
  Reaction time _____ hours__ 2
(b) Aminolysis:
  Reaction temperature _____ °C__ 320
  Reaction time _____ hours__ 4

Yield: 95.4 grams=56% of theory (N-ethyl-2-pyrrolidone)
B.P.$_{(14\ mm.)}$: 91–97° C., $n_{20}$=1.4625

Example III

Procedure as in Example I.

Starting materials:
  150 grams of ethyl acrylate
  17.5 grams of $Co_2(CO)_8$ in 150 ml. benzene
  200 grams of hexylamine Reaction conditions:

(a) Hydroformylation:
  Initial pressure _____ atm__ 200
  Final pressure _____ atm__ 300
  Reaction temperature _____ °C__ 250
  Reaction time _____ hours__ 2
(b) Aminolysis:
  Reaction temperature _____ °C__ 320
  Reaction time _____ hours__ 4

Yield: 145.7 grams=57.5% of theory (N-hexyl-2-pyrrolidone)
B.P.$_{(9\ mm.)}$: 133–143° C., $n_{20}$=1.4605
Analysis.—Calculated: C, 70.9; H, 11.3; N, 8.3; M.G., 169.26. Found: C, 70.6; H, 11.2; N, 8.8; M.G., 169.

*Example IV*

Procedure as in Example I.

Starting materials:
    100 grams of ethyl acrylate
    11.67 grams of $Co_2(CO)_8$ in 100 ml. benzene
    270 grams laurylamine Reaction conditions:

(a) Hydroformylation:
    Initial pressure _____atm__ 200
    Final pressure _____atm__ 300
    Reaction temperature _____°C__ 250
    Reaction time _____hours__ 2
(b) Aminolysis:
    Reaction temperature _____°C__ 320
    Reaction time _____hours__ 4

Yield: 178.4 g.=70.6% of theory (N-lauryl-2-pyrrolidone)
B.P.$_{(0.05\ mm.)}$: 146–151° C.
Analysis.—Calculated: C, 75.8; H, 12.3; N, 5.5; M.G., 253.42. Found: C, 75.6; H, 12.0; N, 6.0; M.G., 253.

*Example V*

Procedure as in Example I.

Starting materials:
    150 grams of ethyl acrylate
    17.5 grams of $Co_2(CO)_8$ in 150 ml. benzene
    200 ml. of benzene
    150 grams of ammonia Reaction conditions:

(a) Hydroformylation:
    Initial pressure _____atm__ 200
    Final pressure _____atm__ 285
    Reaction temperature _____°C__ 252
    Reaction time _____hours__ 3
(b) Aminolysis:
    Reaction temperature _____°C__ 290
    Reaction time _____hours__ 4

Yield: 74 grams=58% of theory (2-pyrrolidone)
B.P.$_{(15\ mm.)}$=134° C.

*Example VI*

Procedure as in Example I.

Starting materials:
    71 grams of ethyl β,β-dimethylacrylate
    9.34 grams of $Co_2(CO)_8$ in 80 ml. benzene
    200 ml. of benzene
    100 grams of ammonia Reaction conditions:

(a) Hydroformylation:
    Initial pressure _____atm__ 170
    Final pressure _____atm__ 278
    Reaction temperature _____°C__ 240
    Reaction time _____hours__ 2½
(b) Aminolysis:
    Reaction temperature _____°C__ 300
    Reaction time _____hours__ 4

Yield: 44.3 grams=72% of theory (4-methyl-2-piperidone)
B.P.$_{(9\ mm.)}$: 131° C., $n_{20}$=1.4711
M.P.: 91.5° C.
Analysis.—Calculated: C, 63.7; H, 9.8; N, 12.4. Found: C, 63.7; H, 9.7; N, 12.6.

*Example VII*

Procedure as in Example I.

Starting materials:
    192 grams of ethyl β,β-dimethylacrylate
    17.5 grams of $Co_2(CO)_8$ in 150 ml. benzene
    150 ml. of benzene
    90 grams of ethylamine Reaction conditions:

(a) Hydroformylation:
    Initial pressure _____atm__ 200
    Final pressure _____atm__ 293
    Reaction temperature _____°C__ 250
    Reaction time _____hours__ 2
(b) Aminolysis:
    Reaction temperature _____°C__ 321
    Reaction time _____hours__ 4

Yield: 142 grams=67.4% of theory (N-ethyl-4-methyl-2-piperidone)
B.P.$_{(9\ mm.)}$: 108–115° C., $n_{20}$=1.4559.

*Example VIII*

Procedure as in Example I.

Starting materials:
    128 grams of ethyl β,β-dimethylacrylate
    17.5 grams of $Co_2(CO)_8$ in 150 ml. benzene
    150 grams of hexylamine Reaction conditions:

(a) Hydroformylation:
    Initial pressure _____atm__ 200
    Final pressure _____atm__ 298
    Reaction temperature _____°C__ 250
    Reaction time _____hours__ 2
(b) Aminolysis:
    Reaction temperature _____°C__ 300
    Reaction time _____hours__ 4

Yield: 149 grams=75.6% of theory (N-hexyl-4-methyl-2-piperidone)
$n_{20}$=1.4670

*Example IX*

Procedure as in Example I.

Starting materials:
    71 grams of ethyl β,β-dimethylacrylate
    9.34 grams of $Co_2(CO)_8$ in 80 ml. benzene
    200 ml. of benzene
    200 grams of methylamine Reaction conditions:

(a) Hydroformylation:
    Initial pressure _____atm__ 170
    Final pressure _____atm__ 300
    Reaction temperature _____°C__ 240
    Reaction time _____hours__ 2
(b) Aminolysis:
    Reaction temperature _____°C__ 300
    Reaction time _____hours__ 4

Yield: 61.8 grams=88.4% of theory (N-methyl-4-methyl-2-piperidone)
$n_{20}$=1.4688
B.P.$_{(8\ mm.)}$=94–95° C.

*Example X*

Procedure as in Example I.

Starting materials:
    150 grams of ethyl acrylate
    150 grams of ethanolamine
    17.5 grams of $Co_2(CO)_8$ in 150 ml. benzene Reaction conditions:

(a) Hydroformylation
- Initial pressure _____ atm__ 200
- Final pressure _____ atm__ 298
- Reaction temperature _____ °C__ 253
- Reaction time _____ hours__ 1

(b) Aminolysis:
- Reaction temperature _____ °C__ 302
- Reaction time _____ hours__ 6

Yield: 52.9 grams = 27.3% of theory (N-(β-hydroxyethyl)-2-pyrrolidone)

$n_{20}$ = 1.4978

B.P.$_{(10\ mm.)}$: 172–175° C.

We claim as our invention:

1. A process for the preparation of 2-piperidones and 2-pyrrolidones which consists essentially of reacting a lower alkyl ester of an acid selected from the group consisting of alpha,beta- and beta,gamma - ethylenically unsaturated lower aliphatic carboxylic acids, with carbon monoxide and hydrogen at a hydroformylation temperature of from about 180° C. to about 280° C. and a pressure of from 30 atm. to about 600 atm. in the presence of a cobalt carbonyl hydroformylation catalyst and reacting the resulting hydroformylation products with a compound selected from the group consisting of ammonia and a primary unsubstituted hydrocarbon amine having from 1 to 30 carbon atoms at a temperature which is higher than said hydroformylation temperature in the range of from about 260° to about 320° C.

2. The process of claim 1 wherein said hydrocarbon amine is an alkyl amine.

3. A process according to claim 1 wherein the hydroformylation product is reacted with a primary aliphatic amino having from 1 to 15 carbon atoms at a temperature from about 300° C. to about 320° C.

4. A process according to claim 1 wherein the resulting aminolysis product is distilled over $P_2O_5$.

5. A process according to claim 1 wherein said lower alkyl ester of an ethylenically unsaturated lower aliphatic carboxylic acid is a lower alkyl acrylate.

6. A process according to claim 1 wherein said lower alkyl ester of an ethylenically unsaturated lower aliphatic carboxylic acid is a lower alkyl crotonate.

7. A process according to claim 1 wherein said hydroformylation catalyst is a tributyl phosphine cobalt carbonyl complex.

8. The process for the production of a lower alkyl-substituted 2-piperidone which consists essentially of reacting a lower alkyl ester of acrylic acid with carbon monoxide and hydrogen at a hydroformylation temperature of from about 180° to about 280° C. and a pressure of from about 30 to about 600 atm. in the presence of a cobalt carbonyl hydroformylation catalyst, and thereafter reacting the resulting reaction products with a primary lower alkyl amine, at a temperature which is higher than said hydroformylation temperature in the range from about 260 to about 320° C.

References Cited by the Examiner

UNITED STATES PATENTS

| | | | |
|---|---|---|---|
| 2,505,459 | 4/1950 | Bruson et al. | 260—294.7 |
| 2,610,203 | 9/1952 | Hagemeyer et al. | 260—483 |

OTHER REFERENCES

Bertho et al., Chem. Ber., vol. 90, #10, pages 2319–2325 (p. 2320 relied on) (1957).

Iwanaga et al., Chemical Abstracts, vol. 56, page 10,962, May 14, 1962, extracted from Kogyo Kagaku Zasshi, vol. 63, pages 1754–7 (1960).

JOHN D. RANDOLPH, *Acting Primary Examiner.*

NICHOLAS S. RIZZO, *Examiner.*